United States Patent [19]

Pitchon et al.

[11] 4,371,556

[45] Feb. 1, 1983

[54] SOY-CONTAINING DOG FOOD

[75] Inventors: Esra Pitchon, Flushing, N.Y.; Robert E. Schara, Norwalk, Conn.; William P. Citarella, Port Chester, N.Y.; Joseph Giacone, Purdy's, N.Y.; Frederick A. Zobel, Bedford Hills, N.Y.

[73] Assignee: General Foods Corporation, White Plains, N.Y.

[21] Appl. No.: 192,267

[22] Filed: Sep. 30, 1980

[51] Int. Cl.³ .............................................. A23K 1/18
[52] U.S. Cl. ................................ 426/311; 426/630; 426/634; 426/805
[58] Field of Search ............... 426/805, 634, 311, 630

[56] References Cited

U.S. PATENT DOCUMENTS

| | | | |
|---|---|---|---|
| 3,365,297 | 1/1968 | Burgess et al. | 426/805 X |
| 3,467,525 | 9/1969 | Hale et al. | 426/805 X |
| 3,745,021 | 7/1973 | Van Meddlesworth et al. | 426/805 X |
| 3,865,966 | 2/1975 | Coppage et al. | 426/805 X |
| 4,039,692 | 8/1977 | Clausen | 426/805 X |
| 4,049,840 | 9/1977 | Reesman et al. | 426/634 |
| 4,055,681 | 10/1977 | Balaz | 426/805 X |
| 4,104,406 | 8/1978 | Stringer et al. | 426/805 X |
| 4,127,678 | 11/1978 | Burkwall | 426/805 X |
| 4,211,797 | 7/1980 | Cante et al. | 426/805 X |
| 4,212,894 | 7/1980 | Franzen et al. | 426/805 X |

OTHER PUBLICATIONS

Markley, Soybeans and Soybean Products, vol. II, 1951, Interscience Publishers: New York, pp. 953–957.
Smith et al, Soybeans: Chemistry and Technology, vol. I, 1972, Avi: Westport, Conn., pp. 309 to 316.

*Primary Examiner*—Joseph M. Golian
*Attorney, Agent, or Firm*—Thomas R. Savoie; Daniel J. Donovan

[57] ABSTRACT

The object of the invention is to improve the palatability of soy-containing dog foods.

It is difficult to make foods which are both low in cost and palatable to dogs. Soybeans provide a range of economical proteinaceous materials and are widely used in dog foods. When made under normal processing conditions, these soy-containing dog foods are less palatable than is desired. The present invention improves these foods by selectively treating the soybean proteinaceous material to improve its contribution to the overall palatability of the dog food, thereby improving the overall product palatability. According to a preferred aspect of the invention, soybeans are selectively treated by roasting followed by quenching with a fat, such as soybean oil, added in an amount of about 2 to 15% of the weight of the soybeans.

1 Claim, No Drawings

SOY-CONTAINING DOG FOOD

DESCRIPTION

1. Technical Field

The present invention relates to dog foods, and particularly to soy-containing dog foods.

Dog foods provide a convenient and popular means for assuring proper feeding. While the art is well aware of the nutritional requirements of dogs and is experienced in making rations which are balanced to provide complete nutrition as eaten, the foods must also be economical and palatable. Where the foods are not economical, the dog owner is likely to feed the dog an unbalanced diet of scraps and less expensive cuts of meat. This creates the risk that the dog will not receive the proper nutrition despite the apparently large quantities of food eaten. Similarly, where the foods are unpalatable, the dog may not eat a sufficient quantity to provide complete nutrition. When not eaten, the dog's natural instinct to forage for food can create serious health and social problems.

The desire of the pet food manufacturers to provide both nutrition and low cost has naturally led to the use of soybean proteinaceous ingredients such as whole ground soybeans, soy flour, soy hulls, soybean oil meal, soy concentrate, soy isolate and the like. These products are widely used in dog food formulations, but can detract from the palatability of the foods. Normal processing for preparing dog foods has typically included just enough cooking of the soy to accommodate extrusion into dry or intermediate moisture foods or has occurred as the natural result of retorting to the preparation of canned-type dog foods. The problem with present extrusion techniques employed to process dry dog food is that they do not assure uniform treatment of grains and a sufficient degree of cooking.

2. Background Art

The principal approaches taken by the prior art to improve the palatability of dog foods, which typically contain soy, have been the overt addition of palatability improvers and processing the more palatable components such as fat and meat to heighten their positive impact.

In one prior art approach to improve palatability, Boudreau et al in U.S. Patent Application Ser. No. 888,795, filed Mar. 21, 1978, suggest the addition of certain specific amino acids they have identified as being taste active. Other publications have suggested that certain free fatty acids or combinations of these are particularly advantageous. For example, United Kingdom Patent Specification No. 1,293,378 disclosed what is said to be a synergistic mixture of squalene, oleyl alcohol, oleic acid and linoleic acid for improving the acceptability of livestock and pet foods. And, Netherlands patent publication No. 73-13644 discloses that specific free fatty acids, namely caprylic and caproic, improve the aroma of dog foods.

In another prior art approach, Greenberg et al in U.S. Pat. No. 3,745,023 disclose that winterizing a specific blend of fats tends to enhance the natural attraction of dogs for fat. Also, there are several patents which suggest that specific enzyme treatments of pet food ingredients can enhance the palatability of the pet food. For example, U.S. Pat. No. 3,857,968 to Haas et al discloses that a mixture of fat and protein can be made more flavorful to dogs by reacting it with a mixture of lipase and protease.

These prior art approaches have provided improved palatability; however, they each require adding something extra to the dog food—something that would not be needed on the basis of nutritional content alone, but only for producing a more flavorful product. It would be advantageous to provide a more direct solution to the problem of palatability of soy-containing dog foods.

It is known in the art to subject legumes, such as soybeans and peanuts, and grains, such as wheat and maize, to a wide variety of heating, roasting and steaming processes prior to use in or as human foods. For example, various grains, nuts and seeds are deep fat fried for a variety of reasons prior to human food use according to the disclosures of U.S. Pat. No. 1,097,882, U.S. Pat. No. 2,083,583, U.S. Pat. No. 2,135,593, U.S. Pat. No. 2,219,777, U.S. Pat. No. 3,594,185, U.S. Pat. No. 3,706,573, U.S. Pat. No. 3,881,033 and U.S. Pat. No. 3,914,454. Additionally, bird seed has been heated in oil according to U.S. Pat. No. 1,997,083. And, according to U.S. Pat. No. 3,457,087 and U.S. Pat. No. 3,594,185, nut, pea and bean legumes can be improved for human food use by contacting them with oil after dry roasting. None of these prior art teachings, however, deal with the problem of palatability of soy-containing dog foods.

One prior art patent, U.S. Pat. No. 4,039,692 teaches deep fat frying a whole, soft-moist dog food portion, but does not in any manner recognize that heat treatment of the soy portion alone would improve its acceptance by dogs. Thus, no patent has suggested selectively pretreating a soybean proteinaceous material by heating it prior to preparing a final dog food formulation.

DISCLOSURE OF INVENTION

In accordance with the present invention, an improved process for preparing a nutritionally-balanced, soy-containing dog food, and an improved product of this type are provided. Both the product and the process enable the provision of an improved process for feeding a dog.

The product of the invention is an improved, nutritionally-balanced dog food comprising fat, protein, carbohydrates, vitamins and minerals, wherein the improvement comprises: as a source of protein, a soybean proteinaceous material which has been selectively heated under conditions of time and temperature effective to selectively improve the soybean proteinaceous material such that the palatability of the dog food is improved.

The process of the invention improves current processing for making foods of this type by: selectively heating a soybean proteinaceous material under conditions of time and temperature effective to selectively improve the soybean proteinaceous material such that the palatability of the dog food is improved; and admixing the resulting soybean proteinaceous material with the remaining dog food ingredients in an amount effective to improve the palatability of the dog food. The improved process of feeding a dog entails preparing a dog food according to the invention and feeding it to a dog.

The term palatability is taken in its broad sense of improving the overall acceptance of a food by a dog. The exact mechanism accounting for the improved acceptance has not been determined; however, it is likely that an improved taste, as distinguished from aroma and texture is responsible for the increased palatability the invention provides. Relative palatability is objectively determined by measuring the quantities of various foods which a dog will consume when given a choice in a controlled feeding test.

The process of the present invention can be employed to improve the palatability of virtually any dog food which contains at least one soybean proteinaceous component. Thus, the process of the present invention can be employed in the preparation of dry, intermediate-moisture, or canned dog foods. The dry dog foods contain less than 15% moisture, and typically have a dry, crunchy texture due to the maintenance of the moisture below about 9%. The intermediate-moisture foods have moisture contents above 15% and less than 50%, and will typically have a soft texture with a moisture content in the range of from 20% to 30%. The canned dog foods will have moisture contents above 50%, and typically above 70%.

Typical of the dry dog foods are those disclosed in U.S. Pat. No. 3,119,691. Disclosed therein is a dry pet food having a gravy-forming coating. The coated pet food substrate is prepared by admixing proteinaceous and farinaceous components and extruding them under conditions of temperature and pressure to effect expansion of the product as it exits in the extruder. The preferred dry products are expanded to a degree to incorporate from 25% to 75% by volume of void space. The process of the present invention can employ at least one soybean proteinaceous material and selectively treat it according to the present invention.

Typical of the intermediate-moisture dog foods which can be improved in palatability according to the present invention are those disclosed in U.S. Pat. No. 3,202,514 to Burgess et al. According to that disclosure, proteinaceous meaty materials are cooked with stabilizing solute materials in a first stage and then with the other added pet food materials, which can include farinaceous components, in a second stage prior to shaping and packaging. An improvement on the process described by Burgess et al, is disclosed in U.S. Pat. No. 4,212,894 by Franzen et al. According to that procedure, the proteinaceous meaty materials are processed to prepare a pumpable slurry of fresh, uncooked meaty meaterial in a solution containing sufficient preservative to maintain the meat free from microbial spoilage for a period of at least 5 days, holding the slurry at a temperature effective to maintain homogeneity of the slurry including dispersed fat until needed for processing and then pasteurizing the meaty materials, shaping it with any additional ingredients, and packaging the resulting product.

The process of this invention is particularly well adapted to the process discussed in the above-identified Franzen et al patent because the meaty materials are stabilized in slurries which must contain sufficient liquid material to maintain them flowable and pumpable over extended periods and will usually not contain any dry solids other than those needed for limited preservation. Because the dry ingredients, such as soybean proteinaceous materials, are preferably not added to the slurry for holding, they can be selectively treated and added just before final processing.

Exemplary of the canned dog food product which can be processed in accordance with the present invention are those which contain meat balls comprising at least one soybean proteinaceous component, in a gravy. The method of the invention is carried out in the same manner for dog foods of this type as it would be for those of the dry and intermediate-moisture variety.

While the invention is thus applicable to a wide range of dog food products, the following discussion will focus on the preparation of dry dog foods because these generally contain significant levels of soybean proteinaceous materials and present the most pronounced problems of palatability and ration rejection. Exemplary of a particular dry dog food is that disclosed in U.S. Pat. No. 3,119,691, which can be made with or without the gravy-forming coating described therein.

Because providing proper nutrition is essential, it is important to formulate all dog foods to be nutritionally complete. By nutritionally balancing each individual food ration, it is not then necessary for the dog owner to balance the quantities of different foods supplied. In this manner, the nutritional intake of the dog is assured as long as it intakes a minimum amount of food. Nutritionally-balanced dog foods contain protein, carbohydrates, fats, vitamins, and minerals in the amounts known in the art and established by feeding tests to be sufficient for the proper growth and maintenance of the dog.

The typical dry dog foods have an expanded structure, and preferably contain from 25% to 75% void space. A typical formulation will include from about 35 to about 70% farinaceous ingredients and from about 20 to about 50% proteinaceous ingredients based on the weight of the total mixture. The processing of such a mixture can be done in substantial accordance with the procedure set out in U.S. Pat. No. 3,119,691 to Ludington et al which is incorporated by reference.

Useful as farinaceous materials are corn, wheat, oats, barley and like grain and starch-bearing materials, including the usual milling products of these. Typical farinaceous ingredients are hominy feed, wheat grey shorts, corn germ meal, wheat red dog, wheat germ meal, wheat middlings, wheat bran, wheat flour, corn flour, rolled oats, ground oats, and the like. The farinaceous materials are important for their starch contents which provide cohesion during shaping, such as by extrusion, and in the final product. Useful as the proteinaceous materials are soybean proteinaceous materials, meaty materials, and other proteinaceous materials to balance the nutrition of the ration or provide specific functional properties as known to the art. Preferably, the proteinaceous ingredients will comprise from 20 to 50% of the weight of the product and be selected from the group consisting of meaty materials and soybean proteinaceous materials.

The term meaty materials is meant to include "meat", "meat by-products", and "meat meal", as these terms are defined in the Definitions of Feed Ingredients published by the Association of American Feed Control Officials, Incorporated. The term "meat" applies to the flesh of cattle, swine, sheep, goats, horses, whale, other animals, poultry and fish. The typical meaty material employed in dry dog food is meat meal which is the finely ground, dry rendered residue from animal tissues. Because of the extremes of processing used to prepare the meat meal, the flavor of soybean proteinaceous materials have a more significant impact on the acceptance of the dog foods containing meat meal than fresh meat.

The soybean proteinaceous component can be present in any desired amount, but will usually be present in an amount of from about 10 to 25% of the weight of the total dog food. Typical of the soybean proteinaceous materials are soy flour, soy grits, ground full-fat soybeans, ground defatted soybeans, soybean oil meal, soy hulls, soy concentrate, pressed partially defatted soybeans, soy isolate, and the like. The soybean proteinaceous material chosen for any particular dog food will be selected on the basis of its nutritional, processing, acceptance, and cost characteristics. Whatever the particular type of soy starting material, it can be selectively processed by a procedure which includes heating. The heating is selective because it is accomplished prior to blending the ingredients into the final blend. This makes it possible to obtain near-optimum treatment of the soybean material without adversely affecting the palatability or functional characteristics of the other ingredients. To accomplish selective treatment, the soybean proteinaceous material is preferably heated by itself. It is possible, however, to heat it in combination with whatever other ingredients are not adversely affected by the treatment or do not adversely affect the obtainment of the benefical results. Some materials, such as fats, can be added as part of a pretreatment procedure or can be employed as a heat transfer medium.

There is no universal set of conditions as to temperature, heat transfer medium, duration of heating, and the like, which can be applied to all soybean proteinaceous materials. This is understandable because of the different physical forms taken by the various soybean materials, the different processing histories of these materials, and the different relative efficiencies of different processes for heating the different materials. The soybean proteinaceous materials are selectively heated under conditions of time and temperature effective to selectively improve the soybean proteinaceous material such that the palatability of the dog food is improved. Depending upon the particular material being treated, this may be done by dry or moist heat with or without contact with a fat. The temperatures should be above 110° C. and should not be hotter than 210° C., and more preferably less than 180° C., unless cooking times and the physical form of the product are adjusted appropriately. The exact temperature and duration of heating will be determined on the basis of actual test, employing the examples which follow as guides.

Fats, of both animal and vegetable origin, can be employed with good results for coating onto the soybean material before or after heating, or for use as the heat transfer medium, as in deep fat frying. Any of the usual edible fats can be employed. Among these are soybean oil, corn oil, coconut oil, safflower oil, palm oil, palm kernel oil, cottonseed oil, tallow, lard, chicken fat and butter oil. One preferred manner of employing a fat is to apply it after heating the soybean proteinaceous material, but while it is still hot. According to this preferred procedure, whole soybeans or soybean oil meal are first heated to a final end temperature of approximately 100° to 130° C. and are then coated with fat while hot. More preferably the final end temperature is between 105° to 125° C. before coating with fat. The final end temperature can be measured by use of a heat sensing device within the soy product. The exact time of heating and temperature will depend upon a number of factors, but generally the time will increase as the temperature increases. And, larger particles will require longer heating times. The coating can be by spraying, immersion or other suitable technique. Preferably, the fat is sprayed onto the hot soybean proteinaceous material in an amount effective to leave a surface fat coating of from about 2 to 20% of the weight of the soybean material. The preferred soybean material according to this procedure is whole soybeans. Most preferably, the whole soybeans are ground after heating and fat coating.

In the preparation of a dry dog food generally as set forth in U.S. Pat. No. 3,119,691 to Ludington et al, farinaceous and proteinaceous components are employed. The proteinaceous component can include ground whole soybeans which are first selectively treated as described above. The dry ingredients are then mixed together to form a mixture having a moisture content typically between 7 to 10%. The moisture content of the mixture is then raised to between 20% and 30% by the addition of water or steam with continued mixing for about 1 to 6 minutes. The mixture is then fed to an extruder-cooker wherein it is subjected to mechanical working under pressure and at elevated temperatures, generally above 100° C. and typically between 115° C. to 150° C. Steam and/or water is typically injected to control moisture and temperature. Instead of the pre-moistening step above-mentioned, all the added moisture can be added during the extrusion-cooking step. The residence time of the mixture within the extruder is relatively short and generally is on the order of 15 to 120 seconds. During this extrusion step, the farinaceous component of the mixture at least partially gelatinizes and expands. The product exits the extruder zone at elevated pressure through a suitable die of desired size to a zone of lower pressure to form an expanded rope structure having a moisture content of from about 20 to 35%. The extruded rope is cut into the desired kib form and is then dried, generally stagewise, at temperatures between about 105° C. to 150° C. with a cooling zone at ambient temperature for about 5 to 20 minutes to a moisture content of from about 7 to 13%.

BEST MODE FOR CARRYING OUT THE INVENTION

The following examples are presented to further illustrate and explain the present invention and are not meant to be limiting in any regard. Unless otherwise indicated, all parts and percentages are by weight.

EXAMPLE I

This example explains the preparation of a preferred dry dog food according to the present invention wherein whole soybeans are heated, sprayed with fat and ground in accordance with the present invention.

The whole soybeans are roasted in a perforated basket type roaster with and end temperature of 118° C. This required approximately 14.5 minutes to accomplish. Immediately upon exiting the roaster, the soybeans are spread into a layer one cm thick and sprayed with soybean oil at a temperature of 25° C. to add a surface coating of 4% soybean oil based on the weight of the soybeans. The thus selectively treated soybeans are then ground through a U.S. Standard 20 mesh screen.

The material thus produced was prepared in a formulation as follows:

| Ingredient | Parts |
|---|---|
| Wheat Middlings | 19.5 |
| Whole ground corn | 44.0 |
| Ground whole soybeans | 22.7 |
| Meat and bone Meal | 11.0 |
| Bleachable fancy tallow | 4.0 |

| Ingredient | Parts |
| --- | --- |
| Vitamins and Minerals | 3.3 |

The ingredients, with the exception of the bleachable fancy tallow are mixed and fed to the entrance of an extruder-cooker operating at temperatures up to about 140° C. After a residence time of about 15 to 120 seconds the mixture exits through a circular extruder die orifice at a moisture of about 23%. The pressure just before the die orifice is about 20 atmospheres. The now expanded porous mixture is cut into kibs 2.5 cm long, 1.25 cm wide, and 1.5 cm thick, using a space cut with the cutting knife positioned 0.65 cm away from the extruder orifice. The kibs are then placed on a drying belt and stagewise dried in three temperature zones of 140° C., 140° C., and 25° C. with the dried kibs exiting the dryer at about 25° C. and approximately 8% moisture. Liquified tallow is then applied to kibs by spraying the liquified at 60° C. in a fine mist onto the kibs.

This food is identified as Sample 1 and is compared to a series of other foods prepared in the same manner but employing soybean proteinaceous materials treated differently.

Sample 2 was the same as Sample 1 except the soybeans are not coated with soybean oil after roasting.

Sample 3 was also similar to Sample 1, but this time the oil is added prior to roasting.

A fourth sample, identified as "control" is prepared in the same manner, but this time employing ordinary soybean oil meal, which has not been selectively treated, in place of the selectively treated materials employed in samples 1, 2 and 3.

Four products prepared as above were compared to four-way kennel feeding study employing 60 dogs for one day. Each dog was allowed to consume as much of the offered foods as it desired on any given day. The consumptions of the various foods were noted, and TABLE 1 summarizes the combined consumption of any two compared foods and the difference in consumption for the food preferred.

TABLE 1

| Comparison | Consumption (g/kg) | | Food Preferred |
| --- | --- | --- | --- |
| | Total | Difference | |
| Sample 1 v. Sample 2 | 22.52 | 7.88 | 1 |
| Sample 1 v. Sample 3 | 19.04 | 10.95 | 1 |
| Sample 1 v. Control | 20.55 | 13.17 | 1 |
| Sample 2 v. Sample 3 | 19.26 | 3.07 | 2 |
| Sample 2 v. Control | 20.26 | 5.30 | 2 |
| Sample 3 v. Control | 17.62 | 2.22 | 3 |

EXAMPLE 2

This example presents another comparison of three test dog foods against the "control".

Sample 4 was the same as Sample 2.

Sample 5 employed whole soy beans which was deep fat fried in soy bean oil for 2 minutes at 175° C.

Sample 6 was the same as sample 5, but this time the heat treatment by deep fat frying lasted 5 minutes.

The results are summarized in TABLE 2:

TABLE 2

| Comparison | Consumption (g/kg) | | Food Preferred |
| --- | --- | --- | --- |
| | Total | Difference | |
| Sample 4 v. Sample 5 | 23.2 | 2.61 | 4 |
| Sample 4 v. Sample 6 | 20.55 | 17.70 | 4 |
| Sample 4 v. Control | 20.03 | 9.86 | 4 |
| Sample 5 v. Sample 6 | 22.89 | 15.08 | 5 |
| Sample 5 v. Control | 23.25 | 7.24 | 5 |
| Sample 6 v. Control | 17.42 | 7.83 | Control |

EXAMPLE 3

This example presents another comparison of three test dog foods against the "control".

Sample 7 was the same as samples 2 and 4.

Sample 8 employed soybean oil meal which was deep fat fried in soy bean oil at 175° C. for approximately 1 minute.

Sample 9 contained soybean oil meal which had been roasted to an end temperature of 118° C., which required approximately 14.5 minutes of roasting, and then sprayed with 4% of its weight of soybean oil while hot.

The results are summarized in TABLE 3:

TABLE 3

| Comparison | Consumption (g/kg) | | Food Preferred |
| --- | --- | --- | --- |
| | Total | Difference | |
| Sample 7 v. Sample 8 | 21.23 | 6.53 | 8 |
| Sample 7 v. Sample 9 | 16.84 | 6.36 | 9 |
| Sample 7 v. Control | 18.26 | 4.56 | Control |
| Sample 8 v. Sample 9 | 21.86 | 0.16 | 8 |
| Sample 8 v. Control | 22.47 | 1.97 | 8 |
| Sample 9 v. Control | 19.65 | 1.81 | 9 |

EXAMPLE 4

Grain explosion is also considered a viable method for pre-conditioning soy beans prior to extrusion for expanding. This process has been shown to increase the digestibility of starch in the soy bean grains. Tests were conducted with a miniperc column. Five pound charges of whole soy beans were both steamed alone and combined with two and five pounds of water prior to pressurizing columns to 150 psi. Pressure was maintained for 10 minutes prior to release to atmospheric conditions. Comparison of sample moisture and density, before and after treatments, indicated that a slight expansion (20% maximum) of soy beans was primarily caused by water absorption and swelling and not by the quick release of steam pressure.

Since moisture adjustment influences the degree of expansion, a gun-puffer was employed having a pre-heating zone which enabled control of the initial moisture content prior to the pressure application. The gun-puffer contained a pre-heating zone through which soy beans were passed prior to being loaded into a puffing chamber zone. Expansion of soy beans were limited to between 40% and 70% most likely due to higher fat levels (16–18%). Preheated air temperature significantly influenced the degree of "roasted effect" in expanded products. Upon feeding the products that have been processed with a gun-puffer, it was found that as pre-heating of soy beans became greater, the product became more acceptable to a canine panel.

This example explains the preparation according to the present invention wherein whole soy beans are heated in a conventional cereal puffing gun. The puffing gun has basically two zones. Zone one preheats the ingredient while zone two heats the ingredient under pressure.

Four samples were prepared according to the following process conditions. Pressure was measured in pounds per square inch gage (psig).

|  | Zone 1 | | Zone 2 | | |
| --- | --- | --- | --- | --- | --- |
|  | Temp. | Time | Temp. | Pressure | Time |
| Sample 10 | 121° C. | 4 Min. | 202° C. | 225 | 30 Sec. |
| Sample 11 | 121° C. | 4 min. | 185° C. | 150 | 60 sec. |
| Sample 12 | 121° C. | 4 min. | 185° C. | 150 | 30 sec. |

After the soy beans had been puffed they were ground and prepared in a formulation as follows:

| Ingredient | Parts |
| --- | --- |
| Whole ground corn | 44.0 |
| Meat and bone Meal | 11.0 |
| Puffed soy beans | 19.5 |
| Wheat Middlings | 22.7 |
| Vitamins and Minerals | 3.3 |

A control was prepared from a similar formula and by the same process, but this time employing ordinary soy bean meal, which had not been selectively treated, in place of the selectively treated materials employed in Samples 10, 11 and 12.

Four products prepared as above were compared in a kennel feeding study employing 40 dogs for one day. The pet food was rehydrated at a ratio of one to one by weight. Each dog was allowed to consume as much of the offered food as it desired on that day. Table 4 summarizes the preference as measured against the control.

TABLE 4

| Comparison | Preference |
| --- | --- |
| Sample 10 v. Control | Moderate loss for Sample 10 |
| Sample 11 v. Control | Moderate win for Sample 11 |
| Sample 12 v. Control | Strong win for Sample 12 |

The above description is for the purpose of teaching those skilled in the art how to practice the present invention and is not intended to recite all the possible modifications and variations thereof which will become apparent to the skilled worker upon reading. It is intended, however, that all such modifications and variations be included within the scope of the invention which is defined by the following claims.

What is claimed is:

1. In a process for preparing a soy-containing dog food wherein fat, protein, carbohydrate, vitamins and minerals are admixed in amounts effective to provide a nutritionally-balanced formulation and wherein the ingredients are mixed with sufficient water to provide a plastic mixture, which mixture is agitated under conditions of heat and pressure in a screw-fed extruder from a zone of high pressure to a zone of reduced pressure to effect expansion of the mixture, and then dried to a moisture content of less than 15% the improvement comprising, roasting whole soybeans at a temperature of from 100° C. to 130° C. and for a time effective to improve the palatability of a dog food which contains from 10 to 25% by weight of said roasted soy, surface coating the roasted soybeans with soybean oil in an amount of from 2 to 20% by weight of the beans, while the beans are still hot, grinding the heated oil-coated beans and thereafter admixing the ground soybeans with the remainder of the dog food formulation so that ground soybeans are present at a level of from 10 to 25% by weight of the dog food.

* * * * *